United States Patent
Duriez et al.

(10) Patent No.: US 11,077,777 B2
(45) Date of Patent: Aug. 3, 2021

(54) SEAT ELEMENT WITH A VENTILATION SYSTEM

(71) Applicant: FAURECIA SIÈGES D'AUTOMOBILE, Nanterre (FR)

(72) Inventors: Didier Duriez, Le Plessis-Pâté (FR); Florent Longatte, Rambouillet (FR); Jean-Marie Mauffrey, Valdoie (FR)

(73) Assignee: FAURECIA SIEGES D'AUTOMOBILE, Nanterre (FR)

( * ) Notice: Subject to any disclaimer, the term of this patent is extended or adjusted under 35 U.S.C. 154(b) by 0 days.

(21) Appl. No.: 16/759,017

(22) PCT Filed: Oct. 26, 2018

(86) PCT No.: PCT/FR2018/052673
§ 371 (c)(1),
(2) Date: Apr. 24, 2020

(87) PCT Pub. No.: WO2019/081871
PCT Pub. Date: May 2, 2019

(65) Prior Publication Data
US 2021/0178946 A1     Jun. 17, 2021

(30) Foreign Application Priority Data

Oct. 27, 2017    (FR) ........................... 1760180

(51) Int. Cl.
*B60N 2/56*      (2006.01)
*B60N 2/58*      (2006.01)
(Continued)

(52) U.S. Cl.
CPC ........... *B60N 2/5657* (2013.01); *B60N 2/686* (2013.01)

(58) Field of Classification Search
CPC ..... B60N 2/5657; B60N 2/5628; B60N 2/686
(Continued)

(56) References Cited

U.S. PATENT DOCUMENTS

| 6,196,627 | B1 * | 3/2001 | Faust | B60N 2/5635 |
| | | | | 297/180.1 |
| 6,682,140 | B2 * | 1/2004 | Minuth | B60N 2/5628 |
| | | | | 297/180.14 |

(Continued)

FOREIGN PATENT DOCUMENTS

WO     2014008997 A1     1/2014

OTHER PUBLICATIONS

International (PCT) Search Report for PCT/FR2018/052673, dated Jan. 16, 2019, 2 pages, (No English Translation).

(Continued)

*Primary Examiner* — Shin H Kim
(74) *Attorney, Agent, or Firm* — Barnes & Thornburg LLP

(57) ABSTRACT

The present disclosure relates to a seat member comprising a first shell, a second shell fixed to the first shell, and a padding covering the second shell such that the second shell is sandwiched between the first shell and the padding, the padding being configured to support a user, and a ventilation system comprising a fan and a duct, the duct being defined by the first shell and the second shell and forming an air passage placing the fan and padding in communication via holes in the second shell. The duct comprises a housing able to receive the fan, and the first shell comprises a door through which the fan can be placed in the housing, the fan having a first orifice for the passage of air between the exterior and the fan, the door having a hole located facing the first orifice.

10 Claims, 2 Drawing Sheets

(51) Int. Cl.
*B60N 2/60* (2006.01)
*B60N 2/68* (2006.01)

(58) Field of Classification Search
USPC .................................................. 297/452.47
See application file for complete search history.

(56) References Cited

U.S. PATENT DOCUMENTS

| | | | | |
|---|---|---|---|---|
| 6,808,230 B2* | 10/2004 | Buss | ................... | B60N 2/5657 |
| | | | | 297/180.12 |
| 8,960,791 B2* | 2/2015 | Dry | ........................ | B60N 2/68 |
| | | | | 297/218.3 |
| 9,096,157 B2* | 8/2015 | Line | ..................... | B60N 2/6009 |
| 9,415,713 B2* | 8/2016 | Line | ........................ | B60N 2/02 |
| 9,707,873 B2* | 7/2017 | Line | ..................... | B60N 2/0232 |
| 9,873,362 B2* | 1/2018 | Line | ........................ | B60N 2/503 |
| 10,279,714 B2* | 5/2019 | Line | ........................ | B60N 2/565 |
| 10,532,674 B2* | 1/2020 | Wright | ................. | B60N 2/5891 |
| 10,543,762 B2* | 1/2020 | Ui | ............................. | B60N 2/58 |
| 10,625,646 B2* | 4/2020 | Kondrad | .................. | B60N 2/62 |
| 2003/0160479 A1* | 8/2003 | Minuth | ................ | B60N 2/5628 |
| | | | | 297/180.14 |
| 2006/0175877 A1* | 8/2006 | Alionte | ................ | B60N 2/5635 |
| | | | | 297/180.14 |
| 2010/0295339 A1 | 11/2010 | Siu | | |
| 2011/0109127 A1* | 5/2011 | Park | ..................... | B60N 2/5657 |
| | | | | 297/180.1 |
| 2011/0109128 A1 | 5/2011 | Axakov | | |
| 2012/0261974 A1* | 10/2012 | Yoshizawa | ........... | B60N 2/5642 |
| | | | | 297/452.42 |
| 2012/0315132 A1* | 12/2012 | Axakov | ................. | B60N 2/565 |
| | | | | 415/182.1 |
| 2015/0008716 A1* | 1/2015 | Dry | ......................... | B60N 2/68 |
| | | | | 297/452.18 |
| 2015/0145303 A1* | 5/2015 | Line | ........................ | B60N 2/02 |
| | | | | 297/283.3 |
| 2018/0020838 A1* | 1/2018 | Ishii | ..................... | F04D 29/162 |
| | | | | 297/180.13 |

OTHER PUBLICATIONS

French Preliminary Search Report for FR1760180 dated Jun. 20, 2018, 2 pages, (No English Translation).

* cited by examiner

SEAT ELEMENT WITH A VENTILATION SYSTEM

CROSS-REFERENCE TO RELATED APPLICATIONS

This application is a U.S. national counterpart application of international application serial No. PCT/FR2018/052673, filed Oct. 26, 2018 which claims priority to French Patent Application No. 1760180, filed on Oct. 27, 2017.

BACKGROUND

The present disclosure relates to a seat member comprising a first shell, a second shell fixed to the first shell, and a padding covering the second shell such that the second shell is sandwiched between the first shell and the padding.

SUMMARY

The present disclosure provides a seat member wherein the fan is fixed and positioned in manner that facilitates efficient manufacture of the seat. The duct comprises a housing able to receive the fan, and the first shell comprises a door through which the fan can be placed in the housing, the fan having a first orifice for the passage of air between the exterior and the fan, the door having a hole located facing the first orifice.

With these arrangements, it is not necessary to use a fastener to attach the fan to the first shell, which facilitates the manufacture of the seat member. In addition, the fan does not protrude from the first shell, which frees up space outside the seat. Furthermore, the fan is placed in its operating position (position where it is able to operate) by the door in the last stage of manufacturing the seat, which facilitates the manufacture of the seat member. In addition, if necessary (for example in case of failure or for maintenance), the fan can be accessed by opening the door.

In addition, the fan is able to operate by blowing through the padding and duct, in other words blowing towards the passenger, air pulled from the passenger compartment through the first orifice.

The door is held in the closed position by a closure mechanism.

The cost of the ventilation function is thus reduced.

The closure mechanism establishes a connection between the door in the closed position and the second shell, this connection being airtight.

The efficiency of the ventilation system is thus increased.

The closure mechanism establishes a connection between the door in the closed position and the second shell, this connection being implemented using an adhesive.

The rim of the hole fits snugly against the first orifice.

The efficiency of the ventilation system is thus increased.

The fan is retained in the housing by a fastening mechanism integral to the second shell.

For example, the fastening of the fastening mechanism is removable.

Maintenance of the fan is thus facilitated, and if necessary the fan can be replaced.

The door is thus held more effectively in the closed position and contributes to securing the fan between the first shell and the second shell.

The present disclosure also relates to a method for manufacturing a seat member.

According to the present disclosure, the method comprises the following steps:

(a) a first shell and a second shell are provided, the first shell comprising a door, (b) the second shell is fixed to the first shell, the first shell and second shell defining a duct forming an air passage, the duct comprising a housing, (c) the second shell is covered by a padding configured to support a user, such that the second shell is sandwiched between the first shell and the padding, the padding being in communication with the duct, (d) a fan is provided and the fan is inserted into the housing through the door, the fan being in communication with the duct.

For example, in step (c), the padding is molded around the duct.

For example, in step (c), the padding is provided with a cavity able to receive the duct, and then the duct is placed and fixed in this cavity.

BRIEF DESCRIPTIONS OF THE DRAWINGS

The detailed description particularly refers to the accompanying figures in which.

DETAILED DESCRIPTIONS

A vehicle seat comprises a seating portion and possibly a backrest, which are supported by a supporting structure (not shown) which is rigid and fixed on the floor of the vehicle. It is equally possible for the seat member 1 to be the seating portion or to be the backrest of the seat.

Figure 1:
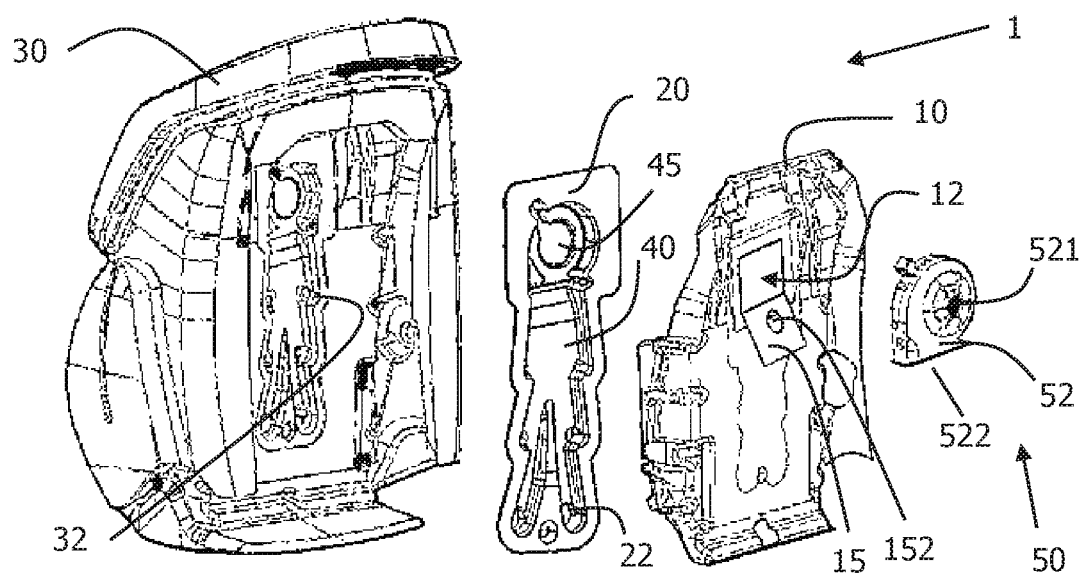
FIG. 1 is an exploded perspective view of a seat member according to the present disclosure, where this member is a backrest.
Figure 2:
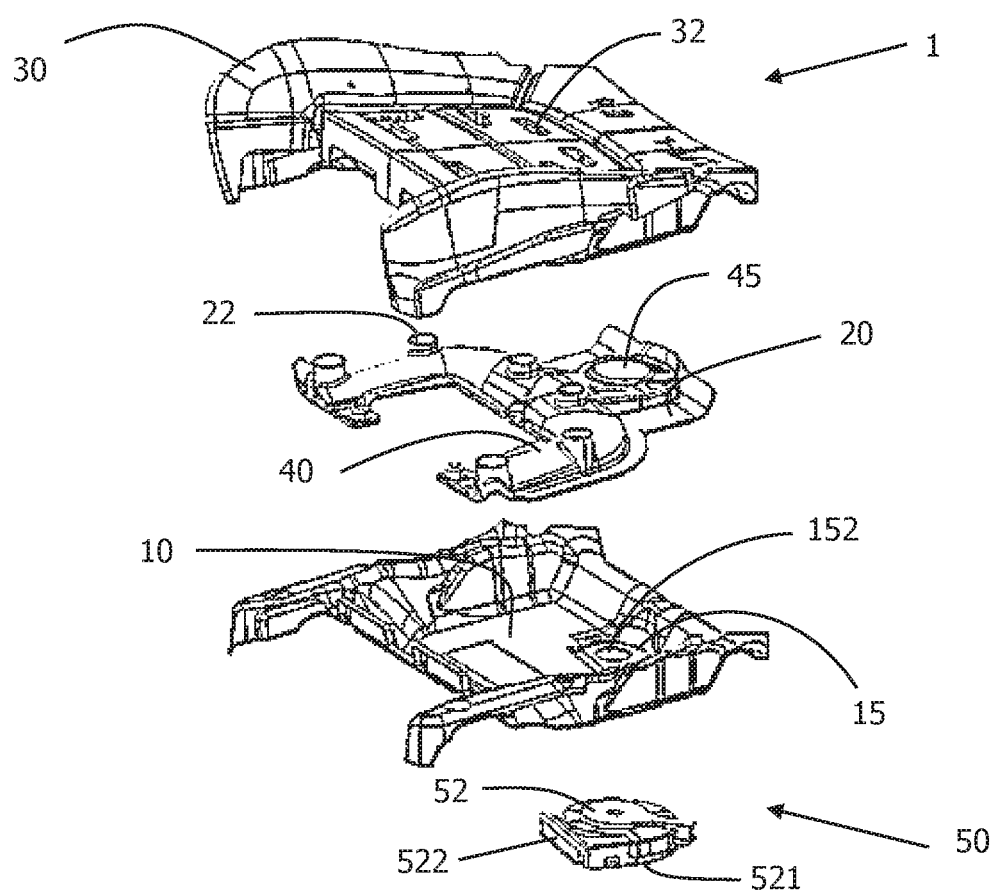
FIG. 2 is an exploded perspective view of a seat member according to the present disclosure, where this member is a seating portion.

As shown in FIG. 1, the seat member 1 is a backrest, and as shown in FIG. 2, the seat member is a seating portion.

In the following description, the term "seat member" is used to designate either the backrest or seating portion, whichever is appropriate.

The seat member 1 comprises padding 30. The padding 30 is soft and is arranged between the supporting structure and a passenger sitting on the seat. For example, the padding 30 consists of foam. The padding 30 thus ensures that the user is comfortable. It is generally covered with a seat covering (not shown).

The seat member 1 comprises a ventilation system 50, which includes a fan 52 and a duct 40 (see below). The purpose of this ventilation system 50 is to ensure the comfort of the passenger sitting on the seat, by circulating air around the passenger through the seat covering and padding. To do this, the ventilation system 50 is in communication with the padding 30 via holes 32 which traverse the padding 30.

The fan 52 comprises vanes or blades, and a motor able to rotate these vanes or blades in order to circulate air through the fan 52.

The fan 52 has a first orifice 521 and a second orifice 522 through which the outside air is in communication with the interior of the fan 52.

For example, with a first category of fan 52, the first orifice 521 is at the center of the fan 52 and the second orifice 522 is at the radial periphery of the fan 52. In this case, the first orifice 521 is the air intake orifice, and the second orifice 522 is the air outlet orifice of the fan.

With a second category of fan 52 (called an axial fan), the first orifice 521 is at the center of the fan 52 on a first face and the second orifice 522 is at the center of the fan 52 on the face opposite said first face.

In a primary operating mode of the axial fan 52, the first orifice 521 is the air intake orifice and the second orifice 522 is the air outlet orifice of the fan.

In a secondary operating mode of the axial fan 52 where the motor rotates in the direction opposite to the direction of rotation in the primary mode, the first orifice 521 is the outlet orifice, and the second orifice 522 is the intake orifice.

The first orifice 521 is thus in communication with outside the seat (in other words with the passenger compartment of the vehicle), and the second orifice 522 opens into the duct 40 (see below).

The seat member 1 comprises a first shell 10, and a second shell 20 located between the first shell 10 and the padding 30, as shown in FIG. 1 and FIG. 2 in exploded perspective view with the different parts separated from each other. The second shell 20 is fixed to the first shell 10 so as to define a duct 40 which extends from the fan 52 to the holes 32 which traverse the padding. For this purpose, the second shell 20 is pierced with holes 22 which face the holes 32 traversing the padding 30.

The duct 40 is airtight, in order to ensure air circulation across the duct 40.

The first shell 10 and the second shell 20 are secured together on the periphery of the duct 40, for example by mechanical fasteners and/or by gluing.

The padding 30 covers one side of the second shell 20. Advantageously, the padding 30 also at least partially covers the first shell 10. The padding 30 thus contributes to the attachment of the first shell 10 to the second shell 20.

In all cases, the duct 40 is wrapped partially or completely in the padding 30.

In the present description, the term "semi-rigid" is understood to mean a plate or shell that can be deformed by hand without tools, and "rigid" is understood to mean a plate or shell of sufficient thickness that the plate or shell cannot be deformed by hand without tools in a manner visible to the naked eye.

The first shell 10 and second shell 20 are semi-rigid. The rigidities of the first shell 10 and second shell 20 are therefore not very high, to avoid reducing the comfort of the passenger sitting on the seat.

The first shell 10 consists of an airtight inner film made of a polymer, for example a polyethylene, and either a single nonwoven outer film placed on one side of the inner film, and optionally wrapping the surface of the padding in contact with the seat structure, or two nonwoven outer films, one outer film being placed on each side of the inner film.

The second shell 20 is made of a polymer, for example a thermoformed polyethylene foam, a nonwoven polyester, or a polypropylene possibly blended with elastomer to reduce its rigidity.

The first shell 10 and second shell 20 can have any shape, provided that they can be placed in the seat member 1 and that they define the duct 40. For example, the first shell 10 is flat at the duct 40, and the second shell 20 is concave at the duct 40, which defines the cross-section and the volume of the duct 40.

The duct 40 is shaped to distribute the air over the largest possible surface area of the seat member 1. The duct 40 comprises a housing 45 able to receive the fan 52.

For example, the duct 40 has a U or V shape with two symmetrical arms located one on each side of the longitudinal axis of the seat member 1, as shown in FIG. 1 and FIG. 2.

For example, as shown in the figures, the housing 45 is located where the arms of the U or V meet, the holes 22 being located in these arms.

The first shell 10 has an opening 12 and a door 15. The door 15 is able to move between an open position where it uncovers the opening 12 and a closed position where it completely covers the opening 12 (except for a hole 152 in the door 15, see below).

For example, the perimeter of the door 15 fits snugly against the edge of the opening 12 when the door 15 is in the closed position.

For example, the perimeter of the door 15 covers the edge of the opening 12 and the region of the first shell 10 that is adjacent to this edge, when the door 15 is in the closed position.

Advantageously, the door 15 is hinged on a hinge 151 which is part of one edge of the opening 12, enabling the door 15 to move between the closed position and the open position.

The opening 12 (and therefore the door 15) is facing the housing 45, so that the fan 52 can be inserted into the housing 45 when the door 15 is in the open position. Once the fan 52 is placed in the housing 45, the door 15 is closed on the fan 52 and it is then in the closed position.

Figure 3:
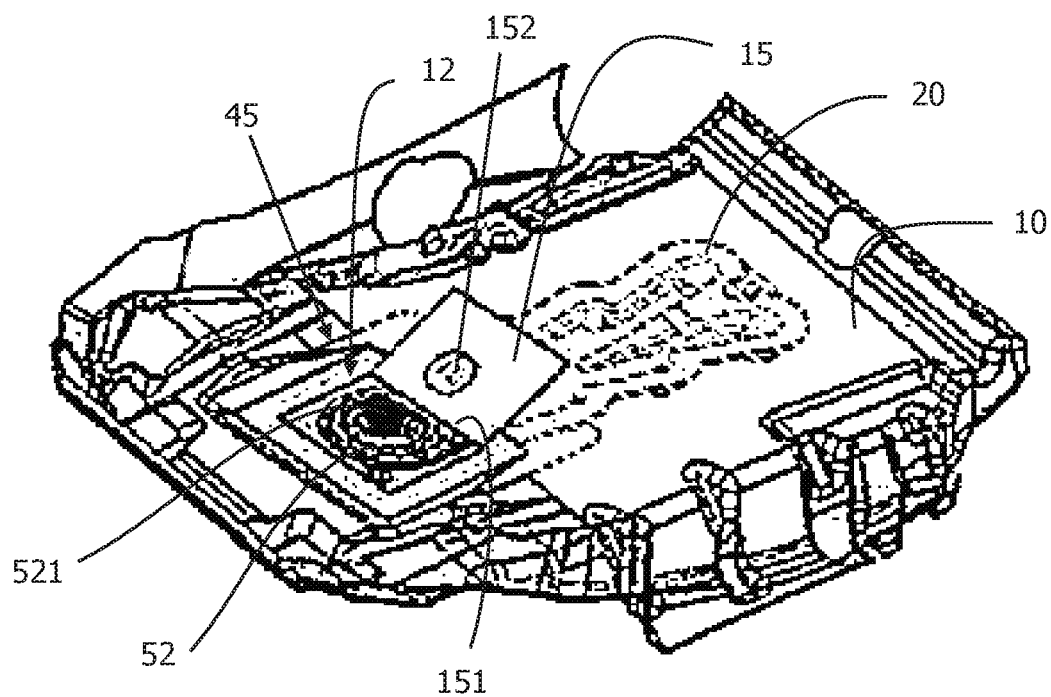
FIG. 3 is a perspective view of a seat member according to the present disclosure.

FIG. 3 shows the fan 52 in the housing 45, the door 15 still being in the open position. The second shell 20 is located under the first shell 10 and is represented with dashed lines.

In this situation (fan 52 placed in the housing 45 and door 15 in the open position), no part of the fan 52 is covered. The fan 52 is placed in the housing 45 by a translational movement in a direction perpendicular to the plane of the opening 12.

Figures 4, 5:
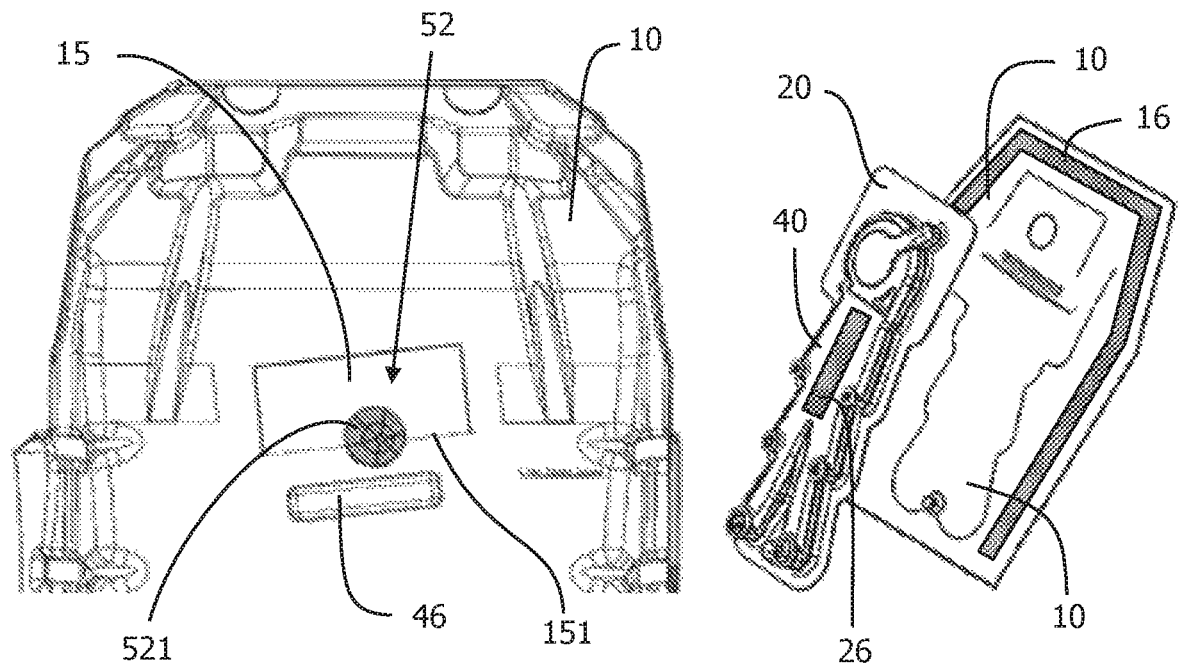
FIG. 4 is another perspective view of a seat member according to the present disclosure.
FIG. 5 is an exploded perspective view of the first shell and second shell of a seat member according to the present disclosure.

Alternatively, in this situation, part of the fan 52 is covered by a portion of the first shell 10 adjacent to the opening 12 and uncovered by the door 15. Thus, the fan 52 is placed in the housing 45 by a rocking motion which in a first step slides a portion of the fan 52, and in particular the second orifice 522, under this portion of the first shell 10. Such a variant is shown in FIG. 4, with the door 15 in the closed position.

The advantage of this variant is that the length of the perimeter of the door 15 is smaller, reducing the risk of leakage where the door 15 meets the edge of the opening 12.

In all cases, when the door 15 is in the closed position and the fan 52 is housed in its housing 45, the fan 52 is only partially covered by the door 15. In fact, the door 15 has a hole 152 which is located facing the first orifice 521 of the fan 52, so that air is able to circulate between the fan 52 and the passenger compartment via this first orifice 521. For example, as shown in FIG. 4, the hole 152 of the door 15 is straddling the hinge 151.

The door 15 is held in the closed position by a closure mechanism.

For example, this closure mechanism is permanent, such as glue.

Advantageously, this closure mechanism is temporary, such as a mechanical system (for example Velcro, a snap-fit, a latch), which allows accessing the fan 52 as often as necessary.

Advantageously, this closure mechanism is between the door 15 and the second shell 20, specifically with the portion of the second shell facing the door 15.

It is therefore not necessary to add an additional part to the first shell 10.

For example, a portion of the inner side of the door 15 is in contact with the second shell 20 when the door 15 is in the closed position, and this portion is covered with an adhesive, permanent or temporary, or a mechanical catch. The door 15 thus contributes to keeping the fan in place in its housing 45.

Advantageously, the junction between the door and the second shell created by this closure mechanism is airtight.

The efficiency of the ventilation system is thus increased.

The closure mechanism may be between the door 15 and the first shell 10, or additionally or alternatively between the door 15 and the second shell 20, by means of an interface (additional part creating this connection between the door 15 and the first shell 10).

Optionally, the portion of the inner face of the door 15 which is in contact with the fan 52 is also covered with an adhesive.

Additionally or alternatively, the fan 52 is retained in its housing 45 by an fastening mechanism integrated with the second shell 20.

Advantageously, this fastening is removable. For example, this fastening is a snap-fit.

When the fan 52 is housed in its housing 45, the second orifice 522 is located between the first shell 10 and the second shell 20. The second orifice 522 thus opens into the duct 40.

In the primary operating mode of the axial fan 52, or with the first category of fan 52, the air is sucked from the exterior through the first orifice 521 (intake orifice) and released through the second orifice 522 (output orifice) into the duct 40. The ventilation system is then operating in "blower" mode, air being blown through the padding 30 towards the passenger via the holes 32.

Advantageously, the duct 40 comprises a baffle 46 immediately after the second orifice 522, to force the air blown by the fan 52 to travel into the duct 40 and to prevent this air from traveling between the fan 52 and the first shell 10. The baffle 46 forms a convex contour on the first shell 10. The baffle 46 is visible in FIG. 4.

Advantageously, a second baffle is further integrated on the second shell 20, to prevent air from passing between the fan 52 and the second shell 20.

In the secondary operating mode of the axial fan 52, air is sucked from around the passenger, through the padding 30 via the holes 32 and then via the duct 40 to the second orifice 522 (intake orifice), then is blown through the first orifice 521 (outlet orifice) to outside the seat. The ventilation system is then operating in "suction" mode, air being sucked through the seat from around the passenger.

The present disclosure further relates to a method for manufacturing a seat member 1. This method comprises the following steps:

(a) a first shell 10 and a second shell 20 are provided, the first shell 10 comprising a door 15, (b) the second shell 20 is fixed to the first shell 10, the first shell 10 and second shell 20 defining a duct 40 forming an air passage, the duct 40 comprising a housing 45, (c) the second shell 20 is covered by a padding 30 configured to support a user, such that the second shell 20 is sandwiched between the first shell 10 and the padding 30, the padding 30 being in communication with the duct 40, (d) a fan 52 is provided and the fan 52 is inserted into the housing 45 through the door 15, the fan 52 being in communication with the duct 40.

According to a first embodiment, in step (c), the padding 30 is molded around the duct 40. For example, the padding 30 is prepared from a liquid that turns into foam upon contact with the air. The duct 40 is held in the padding 30 due to the fact that when the foam expands within the mold, the foam adheres to the surface of the duct 40, thus ensuring the seal between the duct 40 and the padding 30. The foam therefore at least partially covers the first shell 10 and the second shell 20, for example one entire side of the second shell 20.

This solution is illustrated in FIG. 1 in which the first shell 10 and the second shell 20 are shown as detached from the padding 30, to illustrate the relative positioning of these different elements.

According to a second embodiment, in step (c) the padding 30 is molded separately, with a cavity able to receive the duct 40. The duct 40 is then placed in and fixed to this cavity. The duct 40 is fixed in this cavity by integral attachment between the padding 30 and the first shell 10, for example along the perimeter of the first shell 10. This integral attachment is achieved for example by bonding or mechanical connection. This ensures a seal between the duct 40 and the padding 30. In addition, the first shell 10 and second shell 20 may be integrally attached to one another.

For example, the bonding is achieved by applying double-sided tape 16 to the first shell 10. Advantageously, the double-sided tape 16 is applied to some or all of the perimeter of the first shell 10, as shown in FIG. 5. The sealing between the first shell 10 and the padding 30 is improved, and thus the sealing of the duct 40. Advantageously, as shown in FIG. 5, double-sided tape 26 is applied to the second shell 20, for example in the center and/or on its perimeter, in order to bond the second shell 20 to the padding 30. The integrity of the duct 40 is thus reinforced. Additionally or alternatively, double-sided tape 26 is applied to the second shell 20, for example on its perimeter, in order to bond the second shell 20 to the first shell 10.

A seat member comprising a first shell, a second shell fixed to the first shell, and a padding covering the second shell such that the second shell is sandwiched between the first shell and the padding. The padding being configured to support a user, and a ventilation system comprising a fan and a duct, the duct being defined by the first shell and the second shell and forming an air passage placing the fan and padding in communication via holes in the second shell.

A vehicle seat (for a motor vehicle for example) comprises a seating portion and a backrest, which are supported by a supporting structure which is rigid and fixed to the floor of the vehicle. A seat member, which can be the seating portion or the backrest, comprises padding. The padding is soft and is arranged between the supporting structure and a passenger sitting on the seat. The padding thus ensures that the user is comfortable. It is usually covered with a seat covering.

The seat member may also comprise a ventilation system. The ventilation system comprises a fan that is able to circulate air with the passenger compartment of the vehicle. The purpose of this ventilation system is to ensure the comfort of the passenger sitting on the seat, by circulating air under and around the passenger. As this circulation must occur through the seat covering and padding, the ventilation system is in communication with the padding via holes that traverse the padding.

The ventilation system comprises a duct that extends within the seat member from the fan to the holes that traverse the padding. This duct is formed by a first shell (also called "sealing fleece") and a second shell (also called "half duct"), this second shell being sandwiched between the first shell and the padding.

In the present description, the term "shell" is understood to mean a part, generally non-planar, of which one of the dimensions (thickness) is small compared to the other two.

In a comparative seat member, the fan is fixed to the first shell, externally thereon, and positioned so that the air intake of the fan is facing a hole in the first shell that leads to the duct. When operating, air is drawn in by the fan and flows from the holes in the padding through the duct to cross the fan. This drawn air is released into the passenger compartment by the air outlet of the fan, which is located outside the first shell.

To secure the fan to the exterior of the first shell in a stable manner, a fastener (for example a mechanical interface fixed to the first shell, or a set of screws and nuts) and/or glue is used on the portion of the fan that is in contact with the first shell or this mechanical interface.

Such a comparative seat member has drawbacks. It requires the use of a fastener and/or glue to fix the fan on the first shell. In addition, it is generally necessary to add sealing parts around the fan to ensure a seal between the fan and the first shell.

The present disclosure aims to overcome these disadvantages.

The invention claimed is:

1. Seat member comprising a first shell, a second shell fixed to said first shell, and a padding covering said second shell such that said second shell is sandwiched between said first shell and said padding, said padding being configured to support a user, and a ventilation system comprising a fan and a duct, said duct being defined by said first shell and said second shell and forming an air passage placing said fan and padding in communication via holes in said second shell, said seat member being characterized in that said duct comprises a housing able to receive said fan, and said first shell comprises a door through which said fan can be placed in said housing, said fan having a first orifice for the passage of air between the exterior and said fan, said door having a hole located facing said first orifice.

2. Seat member according to claim 1, wherein said door is held in the closed position by a closure mechanism.

3. Seat member according to claim 2, wherein said closure mechanism establishes a connection between said door in the closed position and said second shell, this connection being airtight.

4. Seat member according to claim 2, wherein said closure mechanism establishes a connection between said door in the closed position and said second shell (20), this connection being implemented using an adhesive.

5. Seat member according to claim 1, wherein the rim of said hole fits snugly against said first orifice.

6. Seat member according to claim 1, wherein said fan is retained in said housing by a fastening mechanism integral to said second shell.

7. Seat member according to claim 1, wherein said fastening of the fastening mechanism is removable.

8. Method for manufacturing a seat member, characterized in that it comprises the following steps:
   (a) providing a first shell and a second shell, said first shell comprising a door,
   (b) fixing said second shell to said first shell, said first shell and said second shell defining a duct forming an air passage, said duct comprising a housing,
   (c) covering said second shell by a padding configured to support a user, such that said second shell (20) is sandwiched between said first shell and said padding, said padding being in communication with said duct,
   (d) providing a fan and said fan is inserted into said housing through said door, said fan being in communication with said duct (40).

9. Method for manufacturing a seat member according to claim 8, wherein, in step (c), said padding is molded around said duct.

10. Method for manufacturing a seat member according to claim 8, wherein, in step (c), the padding is provided with a cavity able to receive said duct, and then said duct is placed and fixed in this cavity.

* * * * *